United States Patent
Hamasaki et al.

(10) Patent No.: US 8,238,348 B2
(45) Date of Patent: Aug. 7, 2012

(54) FRAME TRANSMITTING APPARATUS AND FRAME RECEIVING APPARATUS

(75) Inventors: Motoshi Hamasaki, Kawasaki (JP); Satoshi Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 744 days.

(21) Appl. No.: 11/067,291

(22) Filed: Feb. 28, 2005

(65) Prior Publication Data

US 2006/0098674 A1    May 11, 2006

(30) Foreign Application Priority Data

Nov. 8, 2004    (JP) .................................. 2004-323720

(51) Int. Cl.
*H04L 12/56* (2006.01)
*H04L 12/28* (2006.01)
*H04J 3/16* (2006.01)

(52) U.S. Cl. ................... 370/395.51; 370/225; 370/352; 370/389; 370/395.1; 370/395.2; 370/411; 370/442; 370/466; 370/468; 370/469; 714/752; 725/36

(58) Field of Classification Search .......... 370/216–503, 370/537, 538, 505, 504; 375/317; 710/316, 710/317; 445/75; 398/47–135
See application file for complete search history.

(56) References Cited

U.S. PATENT DOCUMENTS

| | | | | |
|---|---|---|---|---|
| 5,568,486 A | * | 10/1996 | Huscroft et al. | 370/395.2 |
| 5,574,717 A | * | 11/1996 | Tomizawa et al. | 370/244 |
| 5,781,596 A | * | 7/1998 | Shields | 375/371 |
| 5,978,377 A | * | 11/1999 | Kim et al. | 370/395.71 |
| 6,058,119 A | * | 5/2000 | Engbersen et al. | 370/466 |
| 6,094,737 A | | 7/2000 | Fukasawa | |
| 6,157,658 A | * | 12/2000 | Toyoyama et al. | 370/505 |
| 6,442,147 B1 | * | 8/2002 | Mauger et al. | 370/321 |
| 6,556,593 B1 | * | 4/2003 | Herkersdorf et al. | 370/532 |
| 6,618,383 B1 | * | 9/2003 | Tomlins | 370/395.5 |
| 6,631,130 B1 | * | 10/2003 | Roy et al. | 370/352 |
| 6,636,511 B1 | * | 10/2003 | Roy et al. | 370/390 |
| 6,636,515 B1 | * | 10/2003 | Roy et al. | 370/395.1 |
| 6,636,529 B1 | * | 10/2003 | Goodman et al. | 370/469 |
| 6,658,074 B1 | | 12/2003 | Murakami | |
| 6,735,171 B2 | * | 5/2004 | Takeguchi | 370/235 |
| 6,771,663 B1 | * | 8/2004 | Jha | 370/473 |

(Continued)

FOREIGN PATENT DOCUMENTS

JP    1992-291598 A    10/1992

(Continued)

OTHER PUBLICATIONS

Japanese Decision of Patent Grant mailed by the Japanese Patent Office on Apr. 13, 2010 for Japanese Patent Application No. 2004-323720. A Partial English-language translation is provided.

*Primary Examiner* — Ayaz Sheikh
*Assistant Examiner* — Venkatesh Haliyur
(74) *Attorney, Agent, or Firm* — Fujitsu Patent Center (57) ABSTRACT

A frame transmitting apparatus that transmits a frame via a synchronous digital hierarch network or a synchronous optical network, includes a data-amount detecting unit that detects an amount of data received from other apparatus; and a frame transmitting unit that transmits, when the amount of data detected by the data-amount detecting unit exceeds a predetermined threshold value, a frame in which information pertaining to a frame control is stored in a fixed stuff of a virtual container frame or a synchronous-transport-signal frame.

4 Claims, 10 Drawing Sheets

U.S. PATENT DOCUMENTS

| | | | |
|---|---|---|---|
| 6,778,561 B1* | 8/2004 | Jha | 370/537 |
| 6,847,644 B1* | 1/2005 | Jha | 370/392 |
| 6,898,647 B2* | 5/2005 | Duvvuru | 710/33 |
| 6,973,084 B1* | 12/2005 | Jha | 370/392 |
| 7,006,525 B1* | 2/2006 | Jha | 370/466 |
| 7,058,008 B1* | 6/2006 | Wilson et al. | 370/216 |
| 7,061,935 B1* | 6/2006 | Roy et al. | 370/468 |
| 7,079,541 B1* | 7/2006 | Loussouarn et al. | 370/395.51 |
| 7,103,008 B2* | 9/2006 | Greenblat et al. | 370/258 |
| 7,106,968 B2* | 9/2006 | Lahav et al. | 398/47 |
| 7,130,264 B2* | 10/2006 | Wiebe et al. | 370/225 |
| 7,209,493 B2 | 4/2007 | Shinoda | |
| 7,227,844 B1* | 6/2007 | Hall et al. | 370/242 |
| 7,324,563 B2* | 1/2008 | Loeffler et al. | 370/535 |
| 7,440,404 B2* | 10/2008 | Nagesh et al. | 370/235 |
| 7,463,626 B2* | 12/2008 | Roy et al. | 370/388 |
| 7,486,614 B2* | 2/2009 | Yu | 370/223 |
| 7,525,977 B1* | 4/2009 | Lecha et al. | 370/411 |
| 7,590,131 B2* | 9/2009 | Ansorge et al. | 370/409 |
| 7,626,999 B2* | 12/2009 | Hsu et al. | 370/466 |
| 7,630,414 B2* | 12/2009 | Clauberg | 370/540 |
| 7,653,924 B1* | 1/2010 | Deng et al. | 725/36 |
| 7,656,910 B2* | 2/2010 | Li | 370/535 |
| 7,693,078 B2* | 4/2010 | Gonda | 370/241.1 |
| 2001/0023494 A1* | 9/2001 | Miyazaki et al. | 714/752 |
| 2003/0117951 A1* | 6/2003 | Wiebe et al. | 370/225 |
| 2003/0120799 A1* | 6/2003 | Lahav et al. | 709/236 |
| 2003/0196076 A1* | 10/2003 | Zabarski et al. | 712/234 |
| 2004/0252638 A1* | 12/2004 | Gonzalez et al. | 370/229 |

FOREIGN PATENT DOCUMENTS

| | | |
|---|---|---|
| JP | 1994-141014 A | 5/1994 |
| JP | 1998-190606 A | 7/1998 |
| JP | 2002-353979 A | 6/2002 |
| JP | 2003-101502 A | 4/2003 |
| JP | 2003-224547 A | 8/2003 |
| JP | 2004-228795 A | 8/2004 |

* cited by examiner

FRAME TRANSMITTING APPARATUS AND FRAME RECEIVING APPARATUS

BACKGROUND OF THE INVENTION

1) Field of the Invention

The present invention relates to a frame transmitting apparatus and a frame receiving apparatus that respectively transmits and receives frames transmitted over the synchronous digital hierarch (SDH) network or the synchronous optical network (SONET), and more particularly, to a frame transmitting apparatus and a frame receiving apparatus that efficiently control a data transmission over the SDH/SONET network without lowering efficiency of a transmission process.

2) Description of the Related Art

Sending Ethernet (registered Trademark) packets over SDH/SONET network by a technology known as Ethernet (registered Trademark) Over SDH/SONET (EOS), has been gaining ground in recent years.

Figure 11:
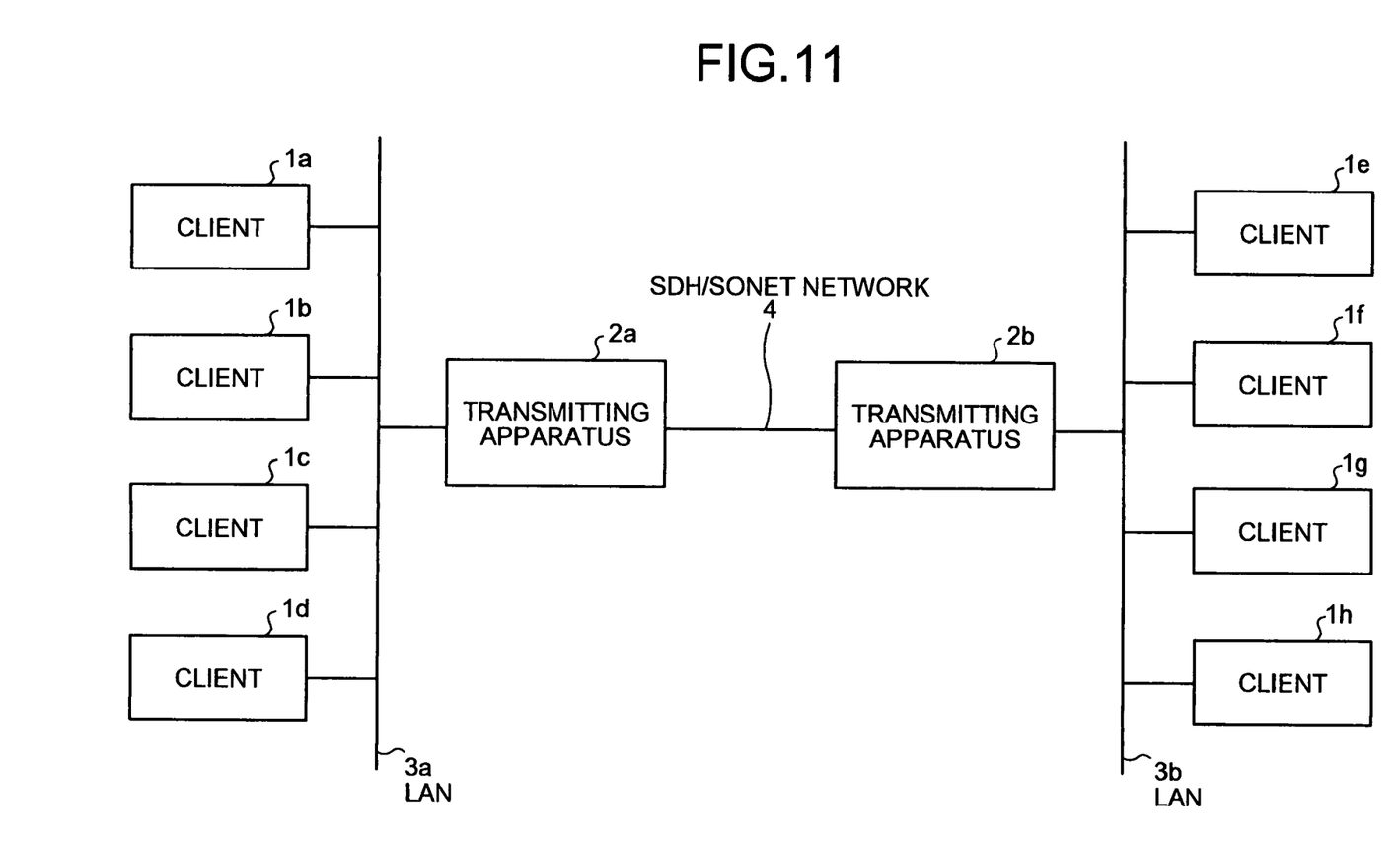
FIG. 11 is a drawing for explaining a conventional EOS technology.

FIG. 11 is a drawing for explaining a conventional EOS technology. In the conventional EOS technology, client devices 1a to 1h send packets over Ethernet (registered Trademark) in the form of a local area network (LAN) 3a and 3b. Transmitting apparatuses 2a and 2b map the packets to virtual container (VC)/synchronous-transport-signal (STS) frames of SDH/SONET and send the VC/STS frames to the opposing transmitting apparatuses 2a and 2b over an SDH/SONET network 4. The client devices 1a to 1h may be routers, and the like.

Upon receiving the SDH/SONET frames, the transmitting apparatuses 2a and 2b convert the SDH/SONET frames into Ethernet (registered Trademark) packets, and send the packets to the client devices 1a to 1h.

The client devices 1a to 1h and the transmitting apparatuses 2a and 2b are provided with oscillators that generate clock signals of a predetermined frequency and carry out data creation and data reading based on the clock signals.

Large variations in the frequencies of the clock signals generated by the oscillators of different devices lead to erroneous data reading. Therefore, Institute of Electrical and Electronic Engineers (IEEE) has stipulated that the difference of frequencies of the clock signals between different devices shall be limited to no more than ±50 ppm.

However, even if the difference of the frequencies of the clock signals between different devices is limited to ±50 ppm, problems in effective transmit of packets may still arise if the frequency of the clock signal is far greater than the standard value.

For instance, let us assume an instance where data is being sent from the client devices 1a to 1d to the client devices 1e to 1h via the transmitting apparatuses 2a and 2b. If the frequency of the clock signals of the client devices 1a to 1d is greater than the frequency of the clock signals of the client devices 1e to 1h, the data sent by the client devices 1a to 1d slowly builds up in the transmitting apparatus 2b, resulting in a possible packet loss.

Further, if there is a limit on the flow rate of data from the client devices 1a to 1d in the SDH/SONET network 4, and if the frequency of the clock signals of the client devices 1a to 1d is large, the data sent from the client devices 1a to 1d slowly builds up in the transmitting apparatus 2a, again resulting in a possible packet loss.

As a countermeasure for packet loss, a range limit method is disclosed in Japanese Patent Laid-Open Publication No. 2002-353979. If the number of packets received from the opposing device exceeds a certain value, a PAUSE packet stipulated by the Ethernet (registered Trademark) standards is sent to the opposing device to control the flow of packets from the device.

However, in the conventional technology disclosed in the above literature, the efficiency of the transmission process carried out over the SDH/SONET network 4 is compromised.

Specifically, when a PAUSE packet is to be sent to the transmitting apparatus 2b over the SDH/SONET network, the transmitting apparatus 2b has to map the PAUSE packet on a VC frame or an STS frame. Consequently, the amount of normal data sent by the transmitting apparatus 2b gets limited, resulting in compromised transmission efficiency.

Again, there is no solution to the problem of accumulating packets sent from the client devices 1a to 1d in the transmitting apparatus 2a arising from the high frequency of the clock signals of the client devices 1a to 1d.

Thus, effectively controlling the data transmission process without compromising the efficiency of data transmission over the SDH/SONET network 4 has become an important issue that needs tackling.

SUMMARY OF THE INVENTION

It is an object of the present invention to solve at least the above problems in the conventional technology.

A frame transmitting apparatus according to one aspect of the present invention, which transmits a frame via a synchronous digital hierarch network or a synchronous optical network, includes a data-amount detecting unit that detects an amount of data received from other apparatus; and a frame transmitting unit that transmits, when the amount of data detected by the data-amount detecting unit exceeds a predetermined threshold value, a frame in which information pertaining to a frame control is stored in a fixed stuff of a virtual container frame or a synchronous-transport-signal frame.

A frame receiving apparatus according to another aspect of the present invention, which receives a frame transmitted via a synchronous digital hierarch network or a synchronous optical network, includes a frame receiving unit that receives a frame in which information pertaining to a frame control is stored in a virtual container frame or a synchronous-transport-signal frame; and a frame control unit that executes the frame control based on the information pertaining to the frame control.

A method according to still another aspect of the present invention, which is for transmitting and receiving a frame via a synchronous digital hierarch network or a synchronous optical network, includes detecting an amount of data received from other apparatus; transmitting, when the amount of data detected by the data-amount detecting unit exceeds a predetermined threshold value, a frame in which information pertaining to a frame control is stored in a fixed stuff of a virtual container frame or a synchronous-transport-signal frame; and executing, upon receiving the frame transmitted at the transmitting, the frame control based on the information pertaining to the frame control.

A system according to still another aspect of the present invention, which is for transmitting and receiving a frame via a synchronous digital hierarch network or a synchronous optical network, includes a data-amount detecting unit that detects an amount of data received from other apparatus; a frame transmitting unit that transmits, when the amount of data detected by the data-amount detecting unit exceeds a predetermined threshold value, a frame in which information pertaining to a frame control is stored in a fixed stuff of a virtual container frame or a synchronous-transport-signal frame; and a frame control unit that executes, upon receiving the frame transmitted by the frame transmitting unit, the frame control based on the information pertaining to the frame control.

The other objects, features, and advantages of the present invention are specifically set forth in or will become apparent from the following detailed description of the invention when read in conjunction with the accompanying drawings.

DETAILED DESCRIPTION

Exemplary embodiments according to the present invention are explained in detail below with reference to the accompanying drawings.

Figure 1:
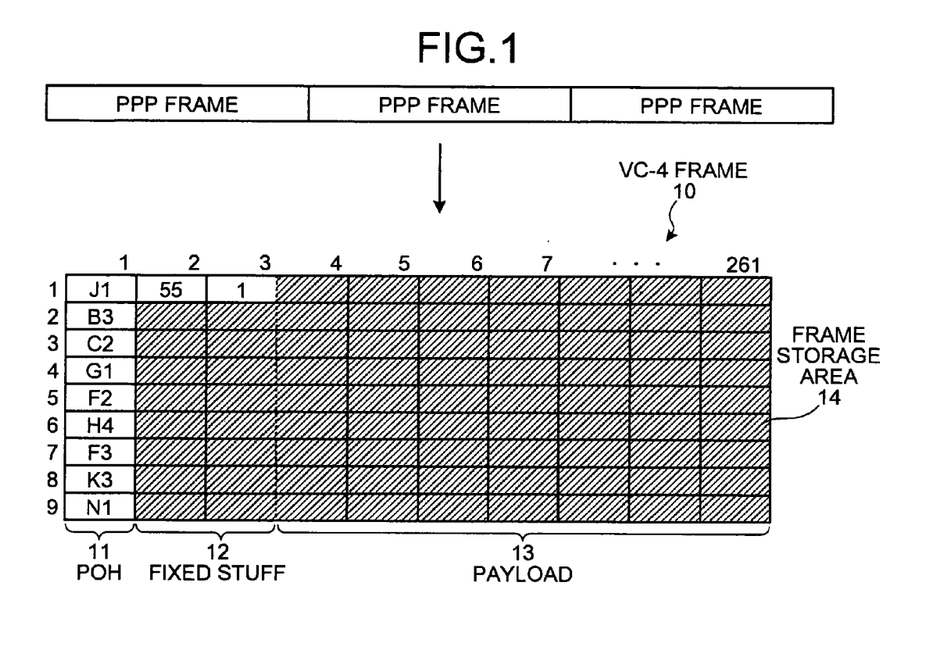
FIG. 1 is a drawing for explaining a transmission and reception process of a VC-4 frame 10 whose fixed stuff 12 is used as a data storage area.

FIG. 1 is a drawing for explaining a transmission and reception process of a VC-4 frame 10 whose fixed stuff 12 is used as a data storage area.

The frame transmission and reception process is carried out under the condition explained with reference to FIG. 11, that is, when the frequency of the clock signal of the client devices 1a to 1d is high and the data sent from the client devices 1a to 1d has accumulated beyond a predetermined level in the transmitting apparatus 2a.

As shown in FIG. 1, the VC-4 frame 10 consists of various areas, that is, a Path Overhead (POH) 11, the fixed stuff 12, and a payload 13. The POH 11 is an area that stores control information pertaining to operational management of frame transmission. The fixed stuff 12 is an area where the value of all the bits is set to "1". The payload 13 is an area that stores Point to Point Protocol (PPP) frames.

When it is determined that the data sent from the client device has been accumulated beyond a predetermined level in the transmitting apparatus, a fixed-stuff-usage information "55" is stored in the fixed stuff 12. The fixed-stuff-usage information "55" indicates that the fixed stuff 12 is being used as a PPP frame storage area. The PPP frames are stored in a frame storage area 14 that includes the fixed stuff 12 and the payload 13, and the VC-4 frame 10 is sent to the transmitting apparatus.

Upon receiving the VC-4 frame 10, the transmitting apparatus can determine whether the PPP frames have been sent with the aid of the fixed stuff 12 by checking if the value "55" is stored in the fixed stuff 12 of the VC-4 frame 10. If the fixed stuff 12 contains the value "55", the transmitting apparatus retrieves the PPP frames from the frame storage area 14.

A transmission error of up to one bit is allowed in the fixed-stuff-usage information. In other words, any value that includes a "5", such as "54", "57", "5D", "45", "75", "15", "D5", etc., is treated as "55". All other values are considered invalid.

Thus, by storing the fixed-stuff-usage information "55" in the fixed stuff 12, and using the fixed stuff 12 as a storage area of the PPP frames when data builds up in the transmitting apparatus, the transmit of data is efficiently controlled and the efficiency of data transmission is enhanced.

Figure 2:
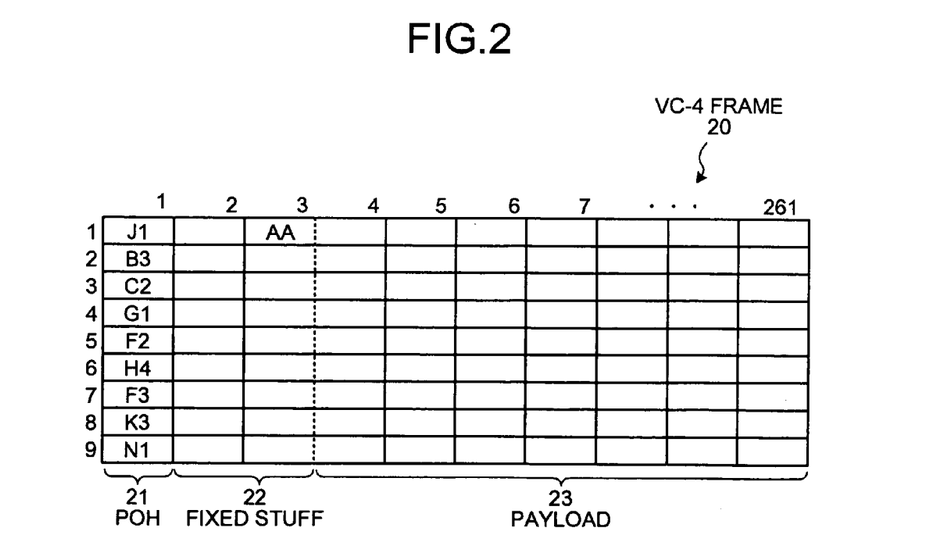
FIG. 2 is a drawing for explaining a transmission and reception process of a VC-4 frame 20 whose fixed stuff 22 is used as a storage area.

FIG. 2 is a drawing for explaining the concept of a transmission and reception process of a VC-4 frame 20 whose fixed stuff 22 is used as a storage area for storing idle-frame-transmit request information. The frame transmission and reception process is carried out under the condition explained with reference to FIG. 11, that is, when the frequency of the clock signal of the client devices 1a to 1d is high and the data sent from the client devices 1a to 1d has accumulated beyond a predetermined level in the transmitting apparatus 2b.

In this process, the transmitting apparatus sends the VC-4 frame 20 that includes the idle-frame transmit request, which is a request to send an idle frame, to a sender transmitting apparatus. Upon receiving the VC-4 frame 20, the sender transmitting apparatus inserts an idle frame between two PPP frames and stores these frames in the VC-4 frame 20, thereby controlling the quantity of PPP frames that is transmitted.

The idle frame is a 4-byte frame having a frame format of generic framing process (GFP) stipulated by the International Telecommunication Union Telecommunication Standardization Sector (ITU-T).

As shown in FIG. 2, idle-frame-transmit request information "AA" is stored the fixed stuff 22 of the VC-4 frame 20. Control information and PPP frames can still be stored in a POH 21 and a payload 23 of the VC-4 frame 20 even though the idle-frame-transmit request information is stored in the fixed stuff 22.

Upon receiving the VC-4 frame 20, the transmitting apparatus can determine whether there is a request for an idle frame by checking if the value "AA" is stored in the fixed stuff 22 of the VC-4 frame 20.

If the value "AA" is stored in the fixed stuff 22, the transmitting apparatus inserts an idle frame between two PPP frames, stores these frames in the VC-4 frame and sends the VC-4 frame to the transmitting apparatus that made the request for an idle frame.

A transmission error of up to one bit is allowed in the idle-frame-transmit request information. In other words, any value that includes an "A", such as "AA", "AB", "A8", "AE", "A2", "BA", "8A", "EA", "2A", etc., is treated as "AA". All other values are considered invalid.

Figure 3:
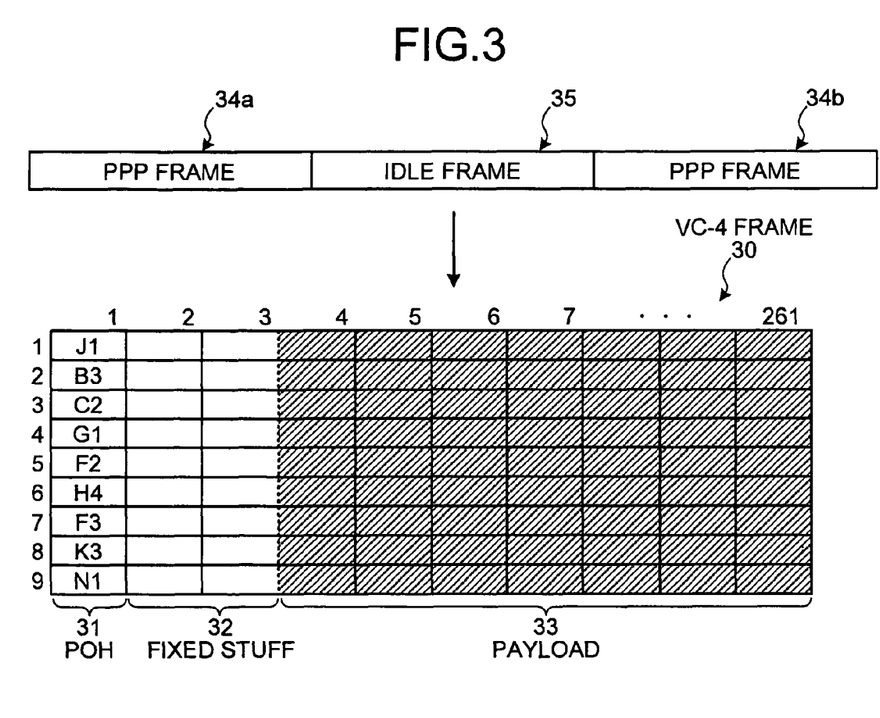
FIG. 3 is a drawing for explaining a process of inserting an idle frame 35 between PPP frames 34a and 34b and storing them in a VC-4 frame 30.

FIG. 3 is a drawing for explaining a process of inserting an idle frame 35 between PPP frames 34a and 34b and storing them in a VC-4 frame 30. As shown in FIG. 3, the transmitting apparatus inserts the idle frame 35 between the PPP frames 34a and 34b and stores these frames in a payload 33 of the VC-4 frame 30. The transmitting apparatus also sets control information and a bit value of "1" in a POH 31 and a fixed stuff 32 of the VC-4 frame 30.

The transmitting apparatus then sends the VC-4 frame 30 to the transmitting apparatus that requested an idle frame, thereby limiting the quantity of PPP frames transmitted to the transmitting apparatus.

Thus, by sending to the opposing transmitting apparatus a VC-4 frame that includes an idle-frame insert request when data builds up in the transmitting apparatus, the idle-frame insert request is efficiently sent without compromising the efficiency of data transmission.

Figure 4:
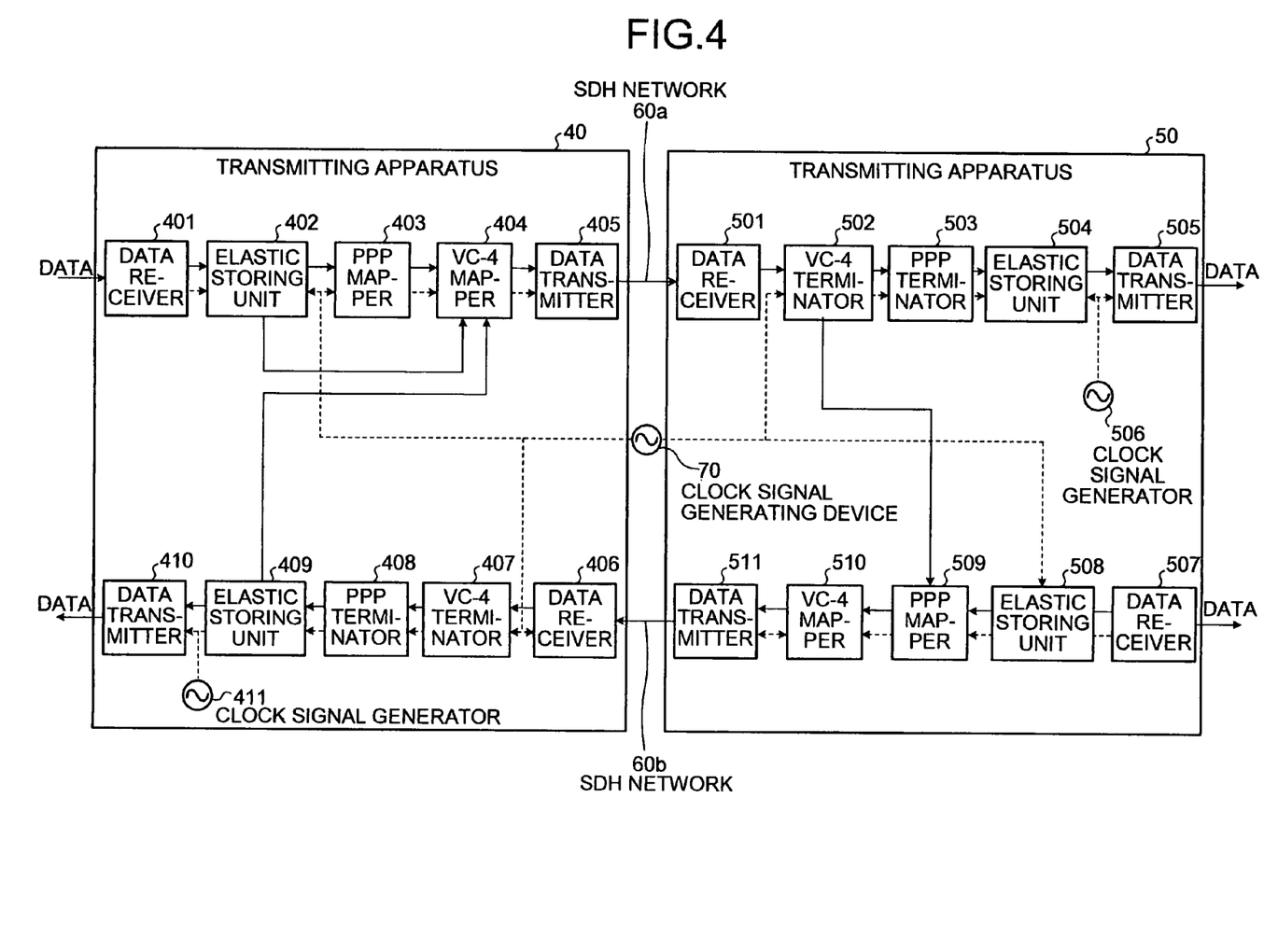
FIG. 4 is a function configuration of a frame transmitting and receiving system according to an embodiment of the present invention.

A functional configuration of a frame transmitting and receiving system according to the present embodiment is explained next. FIG. 4 a functional configuration of the frame transmitting and receiving system according to the present embodiment. The frame transmitting and receiving system includes a transmitting apparatuses 40 and 50 connected via SDH networks 60*a* and 60*b*.

The transmitting apparatuses 40 and 50 are connected to a clock signal generating device 70. The clock signal generating device 70 generates clock signals and feeds these clock signals into the transmitting apparatuses 40 and 50 to synchronize the data being sent over the SDH networks 60*a* and 60*b*.

The transmitting apparatuses 40 and 50 receive data from client devices such as routers, and the like, convert the data into frames of VC-4 format that can be sent over the SDH networks 60*a* and 60*b*, and send the data to the opposing transmitting apparatuses 50 and 40.

The transmitting apparatus 40 includes a data receiver 401, an elastic storing unit 402, a PPP mapper 403, a VC-4 mapper 404, a data transmitter 405, a data receiver 406, a VC-4 terminator 407, a PPP terminator 408, an elastic storing unit 409, a data transmitter 410, and a clock signal generator 411.

The data receiver 401 receives Ethernet (registered Trademark) data from the client device such as a router and separates the clock signal from the data. The elastic storing unit 402 has a memory for storing the data received by the data receiver 401 and keeps track of the data build-up in the memory.

When the data build-up exceeds a specific threshold value, the elastic storing unit 402 requests the VC-4 mapper 404 to send the data by using the fixed stuff of the VC-4 frame as a storage area of the data, as shown in FIG. 1.

The PPP mapper 403 converts the data received from the client device into PPP frames. The VC-4 mapper 404 takes the data converted to the PPP frames and converts it into a VC-4 frame.

Further, upon receiving from the elastic storing unit 402 a request to send the data by using the fixed stuff of the VC-4 frame as a data storage area, the VC-4 mapper 404 stores the fixed-stuff-usage information "55" in the fixed stuff of the VC-4 frame. Furthermore, the VC-4 mapper 404 stores the PPP frames fixed stuff and the payload, which together form the frame storage area.

Figure 5:
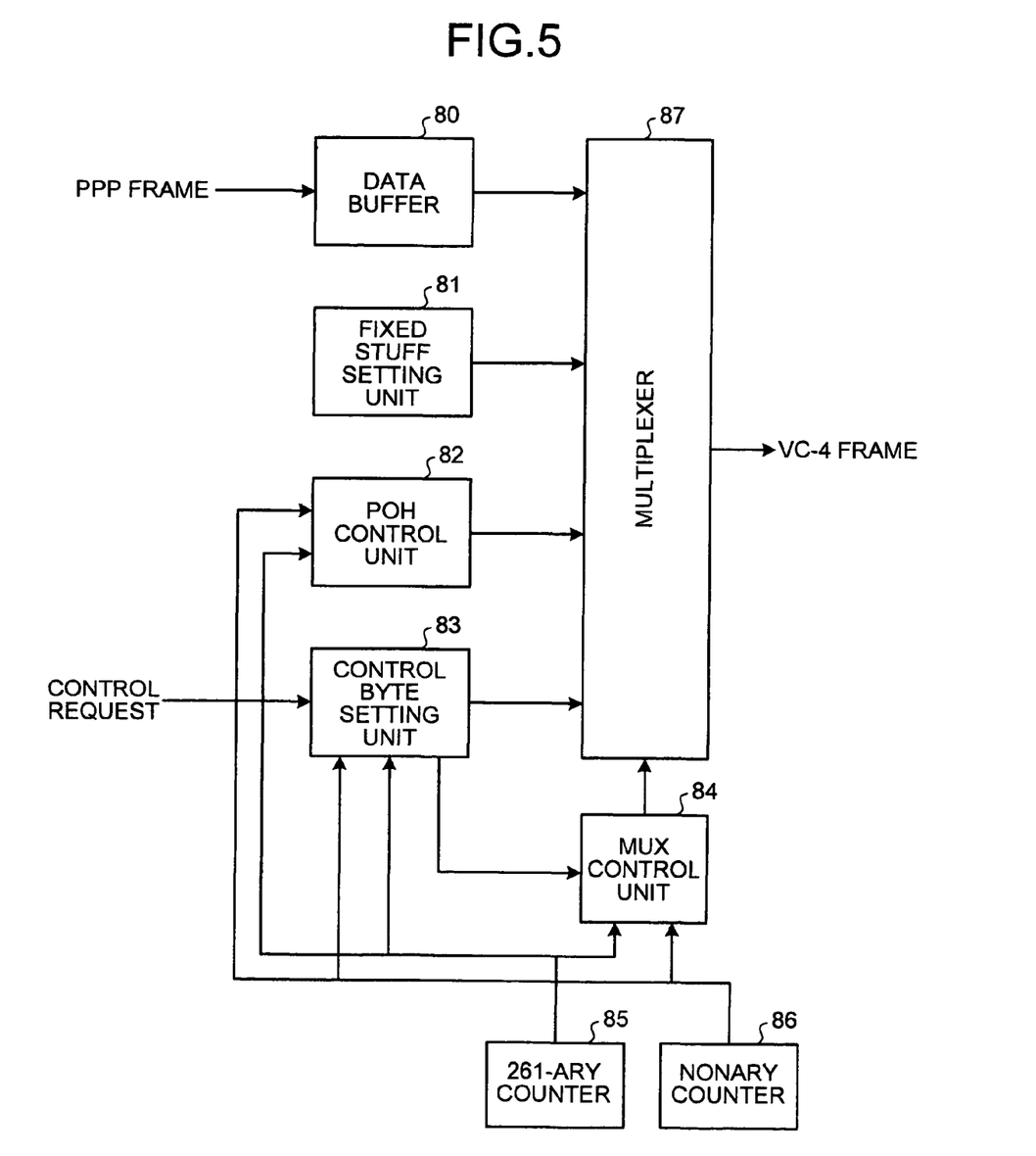
FIG. 5 is a detailed functional configuration of a VC-4 mapper 404 shown in FIG. 4.

FIG. 5 is a detailed functional configuration of the VC-4 mapper 404 shown in FIG. 4. The VC-4 mapper 404 includes a data buffer 80, a fixed stuff setting unit 81, a POH control unit 82, a control byte setting unit 83, a multiplexing (MUX) control unit 84, a 261-ary counter 85, a nonary counter 86, and a multiplexer 87.

Upon receiving from the elastic storing unit 402 the request to use the fixed stuff of the VC-4 frame as the storage area for PPP frames, the control byte setting unit 83 embeds the fixed-stuff-usage information "55" in the fixed stuff and requests the MUX control unit 84 to store the PPP frames in the frame storage area that includes the fixed stuff and the payload.

Further, upon receiving from the elastic storing unit 409, which is described later, idle-frame transmit request to send idle frames to the transmitting apparatus 50, the control byte setting unit 83 embeds the idle-frame-transmit request information "AA" as shown in FIG. 2.

The MUX control unit 84 controls the multiplexer 87 and creates the VC-4 frame by multiplexing the signals obtained from the data buffer 80, fixed stuff setting unit 81, the POH control unit 82, and the control byte setting unit 83.

The 261-ary counter 85 is a counter that counts the columns of the VC-4 frame. The nonary counter 86 is a counter that counts the rows of the VC-4 frame. The multiplexer 87 creates the VC-4 frame by multiplexing the signals obtained from the data buffer 80, the fixed-stuff setting unit 81, the POH control unit 82, and the control byte setting unit 83.

To return to FIG. 4, the data transmitter 405 converts the VC-4 frame created by the VC-4 mapper 404 into an Administrative Unit (AU) frame, then further converts the AU frame into a synchronous transmit module (STM) frame, and sends the STM frame to the transmitting apparatus 50.

The data receiver 406 receives the STM frame sent by the transmitting apparatus 50 via the SDH network 60*b* and carries out an STM frame termination process and an AU frame termination process. The STM frame termination process involves conversion of the STM frame to an AU frame. The AU frame termination process involves conversion of the AU frame into a VC-4 frame.

The VC-4 terminator 407 carries out a VC-4 frame termination process, which involves retrieving the PPP frames stored in the payload of the VC-4 frame. The PPP terminator 408 carries out a PPP frame termination process, which involves conversion of the PPP frames into Ethernet (registered Trademark) data to be sent to the client device.

The elastic storing unit 409 has a memory for storing the data obtained from the termination process carried out by the PPP terminator 408 and keeps track of the data build-up in the memory. When the data build-up exceeds a specific threshold value, the elastic storing unit 409 requests the VC-4 mapper 404 to include the idle frames in the VC-4 frame, as shown in FIG. 2, and send the VC-4 frame to the transmitting apparatus 50.

The data transmitter 410 modulates the data built up in the elastic storing unit 409 and sends the modulated data to the client device. The clock signal generator 411 generates clock signals and feeds the clock signals into the elastic storing unit 409 and the data transmitter 410.

The elastic storing unit 402, the PPP mapper 403, the VC-4 mapper 404, the VC-4 terminator 407, the PPP terminator 408, and the elastic storing unit 409 generate signals by receiving the clock signals generated by the clock signal generating device 70.

The transmitting apparatus 50 includes a data receiver 501, a VC-4 terminator 502, a PPP terminator 503, an elastic storing unit 504, a data transmitter 505, a clock signal generator 506, a data receiver 507, an elastic storing unit 508, a PPP mapper 509, a VC-4 mapper 510, and a data transmitter 511.

The data receiver 501 receives the STM frame sent by the transmitting apparatus 40 via the SDH network 60*a* and carries out the STM frame termination process and the AU frame termination process, respectively involving conversion of the STM frame to an AU frame and conversion of the AU frame to a VC-4 frame.

The VC-4 terminator 502 carries out the VC-4 frame termination process, involving retrieving the PPP frames stored in the payload of the VC-4 frame. When performing the VC-r frame termination process, the VC-4 terminator 502 determines whether the fixed stuff of the VC-4 frame includes either the fixed-stuff-usage information or the idle-frame-transmit request information.

If the fixed stuff of the VC-4 frame includes the fixed-stuff-usage information, the VC-4 terminator 502 retrieves the PPP frames stored in the frame storage area, which includes both the areas, namely, the fixed stuff and the payload.

If the fixed stuff of the VC-4 frame includes the idle-frame-transmit request information, the VC-4 terminator 502 requests the PPP mapper 509 to insert an idle frame between two PPP frames.

Figure 6:
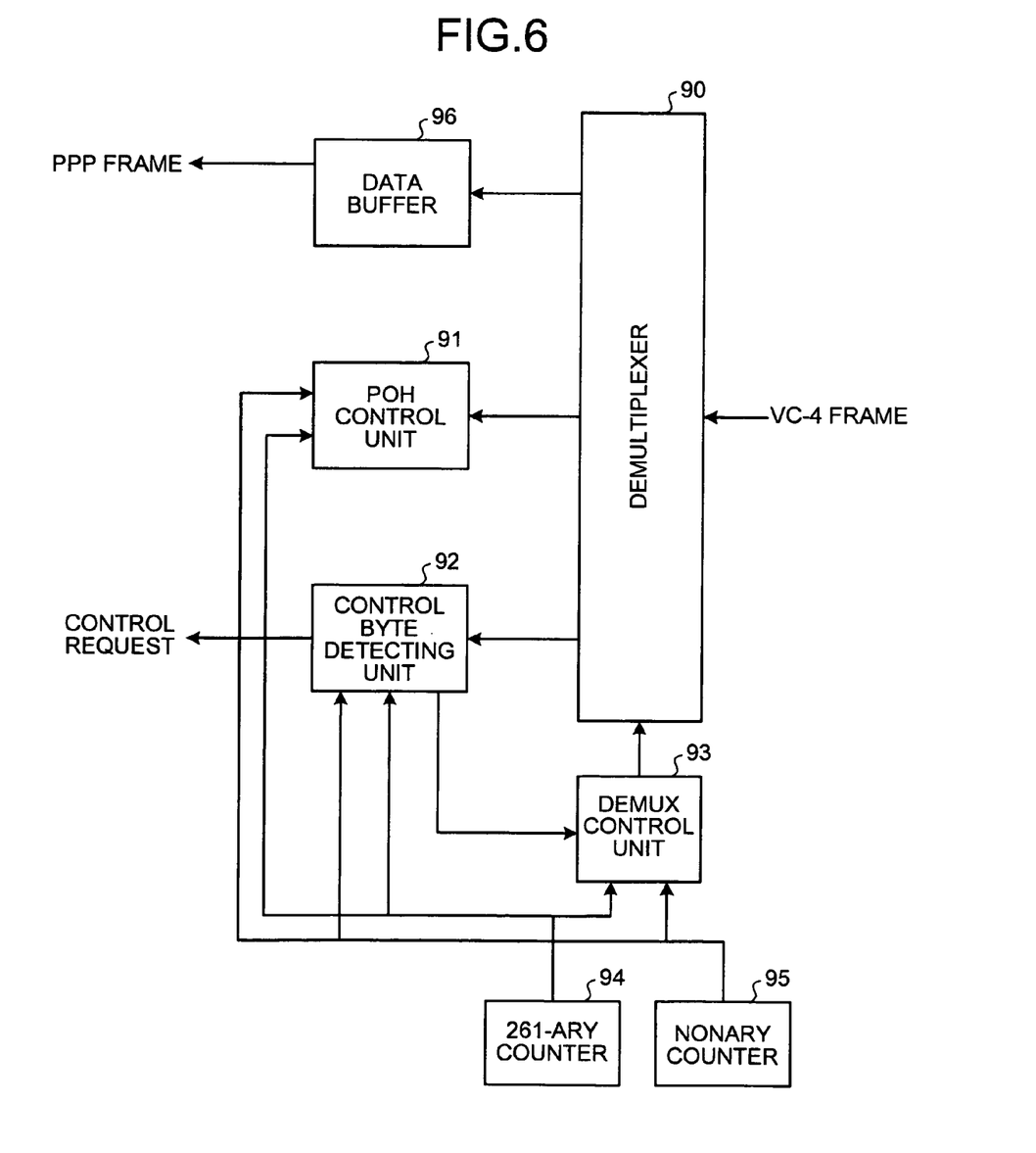
FIG. 6 is a detailed functional configuration of a VC-4 terminator 502 shown in FIG. 4.

FIG. 6 is a detailed functional configuration of the VC-4 terminator 502 shown in FIG. 4. The VC-4 terminator 502 includes a demultiplexer 90, a POH control unit 91, a control byte detecting unit 92, a demultiplexing (DEMUX) control unit 93, a 261-ary counter 94, a nonary counter 95, and a data buffer 96.

The demultiplexer 90 retrieves the VC-4 frame from the data receiver 501 and separates the signals of the POH and the fixed stuff from those of the PPP frames. The POH control unit 91 retrieves information pertaining to the POH from the demultiplexer 90 and carries out operational management of frame transmission.

The control byte detecting unit 92 determines whether the fixed stuff includes either the fixed-stuff-usage information or the idle-frame-transmit request information. If the fixed stuff includes the fixed-stuff-usage information, the control byte detecting unit 92 notifies the DEMUX control unit 93 that the PPP frames are stored in the frame storage area the includes both the areas, namely, the fixed stuff and the payload.

If the fixed stuff includes the idle-frame-transmit request information, the control byte detecting unit 92 requests the PPP mapper 509 to insert an idle frame between two PPP frames. The DEMUX control unit 93 controls the demultiplexer 90 so as to separate the signals of the POH and the fixed stuff of the VC-4 frame from the signals of the PPP frames.

Upon receiving the notification from the control byte detecting unit 92 that the PPP frames are stored in the frame storage area, the DEMUX control unit 93 exerts control over the demultiplexer 90 so as to separate the signals of the PPP frames from the frame storage area.

The 261-ary counter 94 is a counter that counts the columns of the VC-4 frame. The nonary counter 95 is a counter that counts the rows of the VC-4 frame. The data buffer 96 is a buffer where the PPP frames that the demultiplexer 90 separates from the VC-4 frame build up.

To return to FIG. 4, the PPP terminator 503 carries out the PPP frame termination process, which involves conversion of the PPP frames sent to the client device to the Ethernet (registered Trademark) data. The elastic storing unit 504 builds up the data obtained from the PPP frame termination process carried out by the PPP terminator 503.

The data transmitter 505 modulates the data built up in the elastic storing unit 504, and sends the modulated data to the client device. The clock signal generator 506 generates clock signals and feeds the clock signals to the elastic storing unit 504 and the data transmitter 505.

The data receiver 507 receives the Ethernet (registered Trademark) data from the client devices such as routers, and separates the clock signals from the received data. The elastic storing unit 508 has a memory for storing data, and builds up the data received by the data receiver 507.

The PPP mapper 509 converts the data received from the client devices to PPP frames. Further, upon receiving the request to insert an idle frame between two PPP frames from the VC-4 terminator 502, the PPP mapper 509 inserts the idle frame between two PPP frames.

The VC-4 mapper 510 converts the data converted to PPP frames by the PPP mapper 509 to a VC-4 frame. When converting the PPP frames to the VC-4 frame, if idle frames are inserted by the PPP mapper 509, the VC-4 mapper 510 converts both the PPP frames and the idle frames into a VC-4 frame, as shown in FIG. 3.

The data transmitter 511 converts the VC-4 frame created by the VC-4 mapper 510 to an AU frame and further converts the AU frame into an STM frame, and sends the data in the form of an STM frame to the transmitting apparatus 40.

Figure 7:
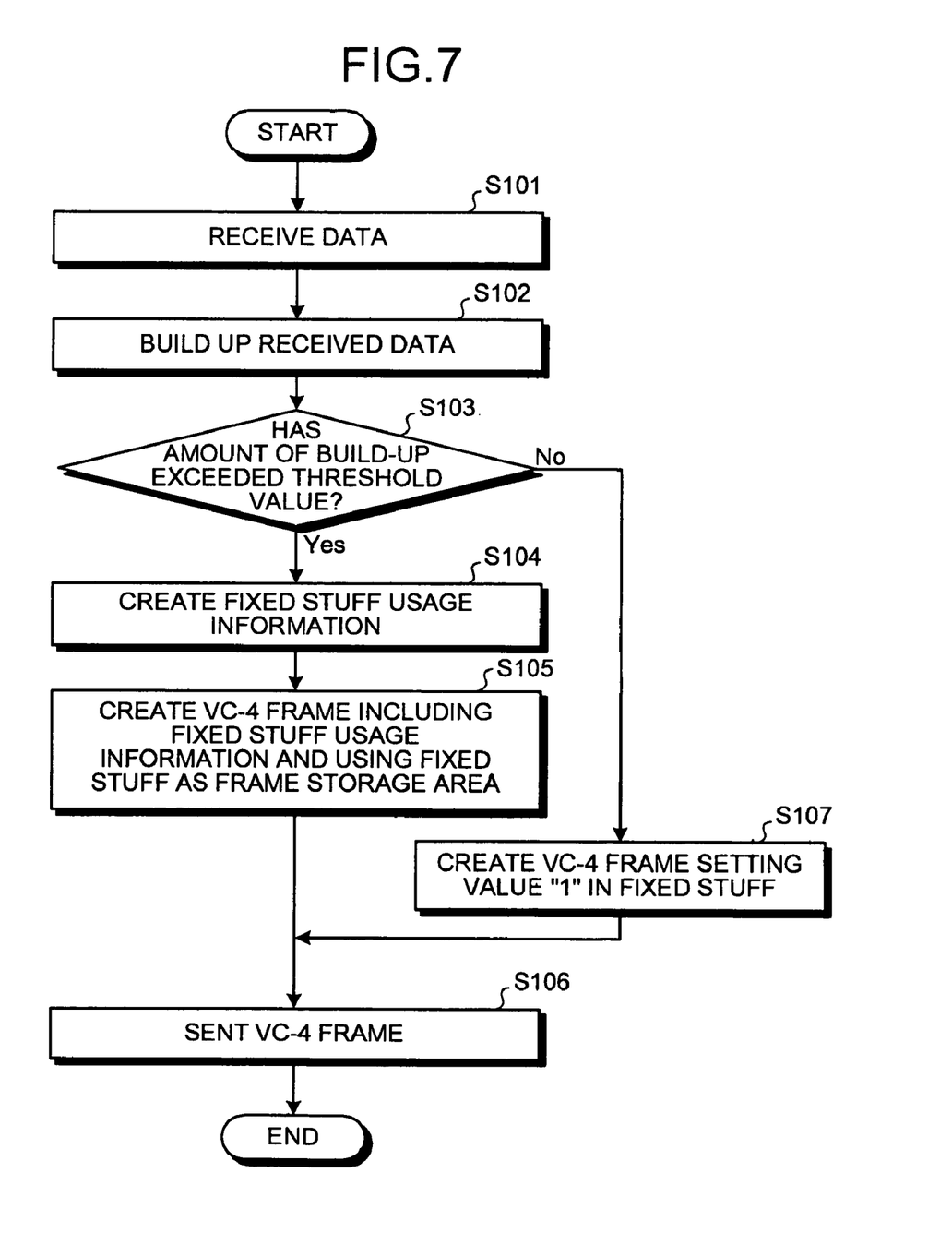
FIG. 7 is a flowchart of a transmitting process of the VC-4 frame whose fixed stuff is used as a storage area of PPP frames.

A transmitting process of the VC-4 frame whose fixed stuff is used as a storage area of the PPP frames is explained next. FIG. 7 is a flowchart of the transmitting process of the VC-4 frame whose fixed stuff is used as a storage area of the PPP frames.

As shown in FIG. 7, the data receiver 401 of the transmitting apparatus 40 receives the data from the client device (Step S101). The elastic storing unit 402 builds up the received data (Step S102) and checks if the data build-up has exceeded a predetermined threshold value (Step S103).

If the data build-up has exceeded the threshold value ("Yes" at step S103), the control byte setting unit 83 of the VC-4 mapper 404 creates the fixed-stuff-usage information that indicates the fixed stuff is used as a storage area of the PPP frames (Step S104).

The multiplexer 87 of the VC-4 mapper 404 includes the fixed-stuff-usage information in the fixed stuff and creates a VC-4 frame in which the fixed stuff is used as the frame storage area for storing the PPP frames (Step S105). The data transmitter 405 sends the created VC-4 frame to the transmitting apparatus 50 (Step S106), thus ending the transmitting process of the VC-4 frame.

If the data build-up has not yet reached the threshold value ("No" at step S103), the multiplexer 87 of the VC-4 mapper 404 creates a VC-4 frame in which the value "1" is set in the entire fixed stuff (Step S107). The process then proceeds to Step S106 in which the data transmitter 405 sends the created VC-4 frame to the transmitting apparatus 50, thus ending the transmitting process of the VC-4 frame.

After the VC-4 frame in which the PPP frames are stored in the fixed stuff is sent, if the data build-up in the elastic storing unit 402 again falls below the threshold value, the VC-4 mapper 404 receives notification to this effect from the elastic storing unit 402, sets the value "1" in the entire fixed stuff, and creates a normal VC-4 frame in which the PPP frames are stored in the payload.

Figure 8:
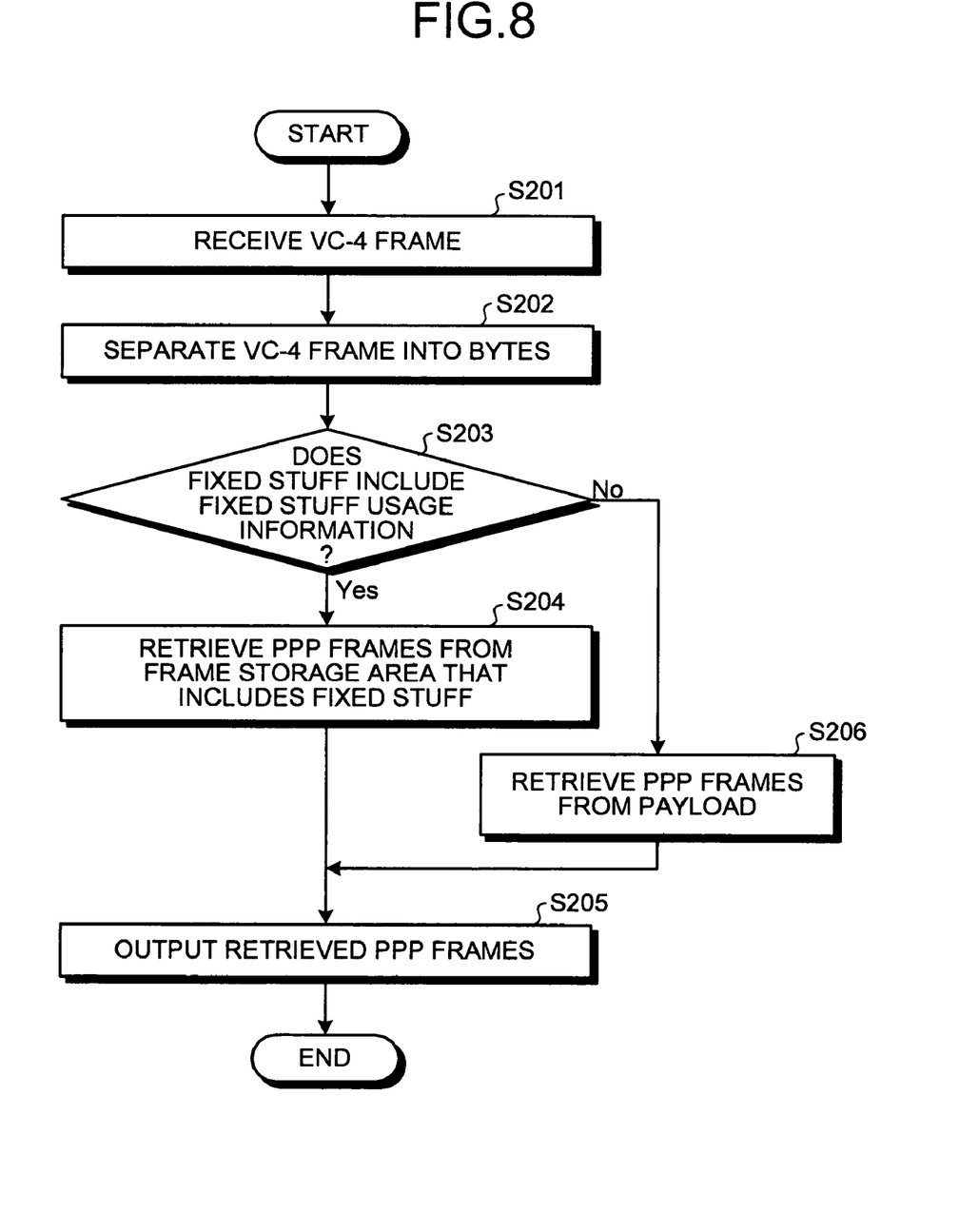
FIG. 8 is a flowchart of a retrieving process of the PPP frame from the VC-4 frame.

A retrieving process of the PPP frames from the VC-4 frame is explained next. FIG. 8 is a flowchart of the retrieving process of the PPP frames from the VC-4 frame.

As shown in FIG. 8, once the data sent by the transmitting apparatus 40 is received by the data receiver 501 of the transmitting apparatus 50, the demultiplexer 90 of the VC-4 terminator 502 receives the VC-4 frame from the data receiver 501 (Step S201).

The demultiplexer 90 separates the VC-4 frame into bytes (Step S202). The control byte detecting unit 92 of the VC-4 terminator 502 determines whether the fixed stuff of the VC-4 frame includes the fixed-stuff-usage information (Step S203).

If the fixed stuff of the VC-4 frame includes the fixed-stuff-usage information ("Yes" at step S203), the demultiplexer 90 of the VC-4 terminator 502 retrieves the PPP frames from the frame storage area that includes both the fixed stuff and the payload (Step S204).

The demultiplexer 90 of the VC-4 terminator 502 then outputs the retrieved PPP frames to the PPP terminator 503 via the data buffer 96 (Step S205), thus ending the retrieving process of the PPP frames.

If the fixed stuff of the VC-4 frame does not include the fixed-stuff-usage information ("No" at step S203), the demultiplexer 90 of the VC-4 terminator 502 retrieves the PPP frames from the payload (Step S206).

The process then proceeds to Step S205, in which the demultiplexer of the VC-4 terminator 502 outputs the retrieved PPP frames to the PPP terminator 503 via the data buffer 96, thus ending the retrieving process of the PPP frames.

Figure 9:
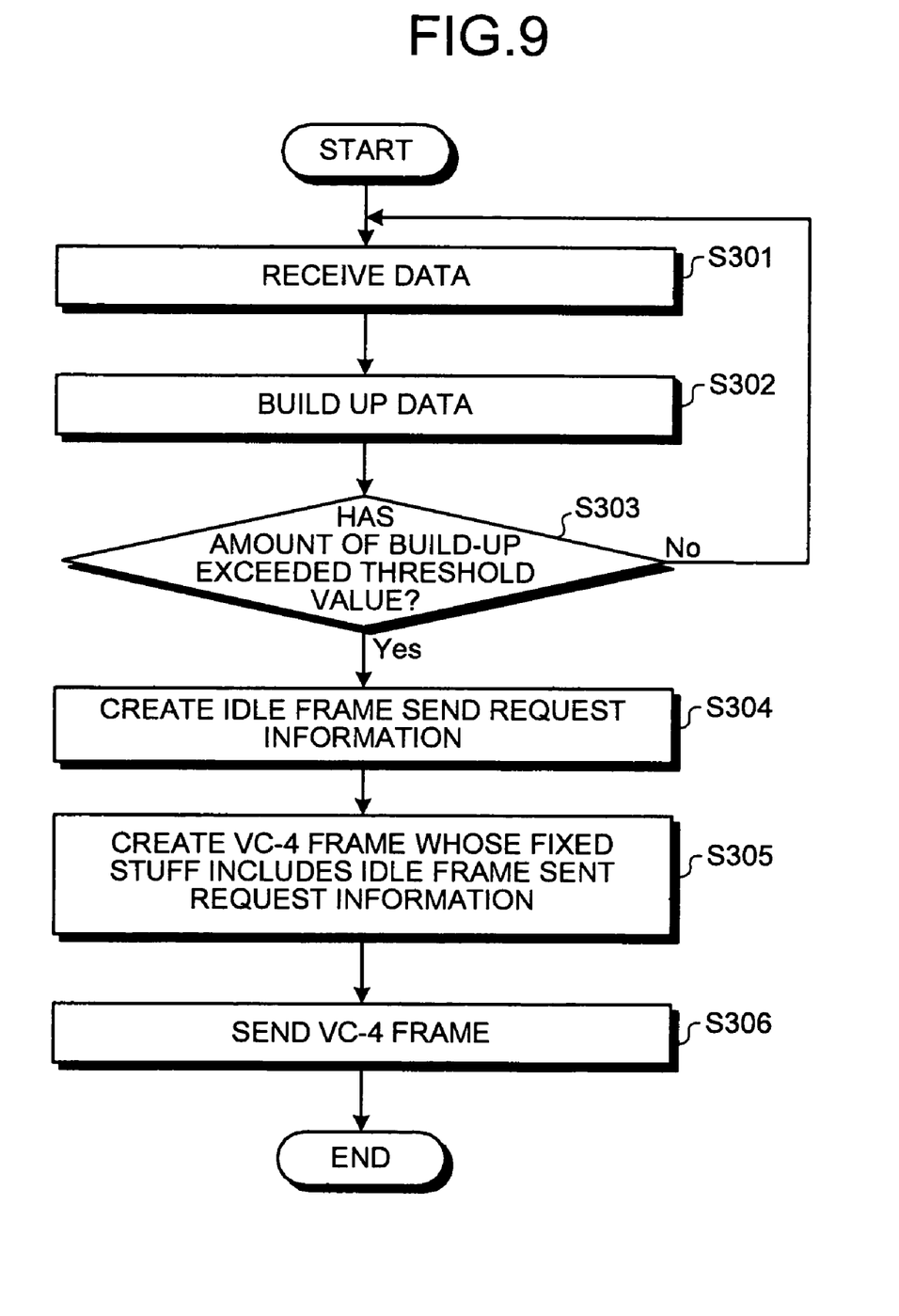
FIG. 9 is a flowchart of the transmitting process of the VC-4 frame whose fixed stuff includes an idle-frame transmit request.

The transmitting process of the VC-4 frame in which the fixed stuff includes the idle-frame-transmit request information is explained next. FIG. 9 is a flowchart of the transmitting process of the VC-4 frame whose fixed stuff includes the idle-frame-transmit request information.

As shown in FIG. 9, the data receiver 406 of the transmitting apparatus 40 receives the data from the transmitting apparatus 50 (Step S301). The elastic storing unit 402 builds up the data received by the data receiver 406 and subjected to the VC-4 frame termination process by the VC-4 terminator 407 and the PPP frame termination process by the PPP terminator 408 (Step S302), and determines whether the build-up exceeds a predetermined threshold value (Step S303).

If the build-up exceeds the threshold value ("Yes" at step S303), the control byte setting unit 83 of the VC-4 mapper 404 receives the control signal from the elastic storing unit 402, and creates the idle-frame-transmit request information (Step S304).

The multiplexer 87 of the VC-4 mapper 404 creates a VC-4 frame whose fixed stuff includes the idle-frame-transmit request information (Step S305). The data transmitter 405 sends the created VC-4 frame to the transmitting apparatus 50 (Step S306), thus ending the transmitting process of the VC-4 frame.

If the build-up has not reached the threshold value ("No" at step S303), the process returns to Step S301 to continue there onwards.

After the VC-4 frame which the idle-frame-transmit request information is stored in the fixed stuff is sent, if the data build-up in the elastic storing unit 409 again falls below the threshold value, the VC-4 mapper 404 receives notification to this effect from the elastic storing unit 409, sets the value "1" in the entire fixed stuff, and creates a normal VC-4 frame in which the PPP frames are stored in the payload.

Upon receiving the VC-4 frame whose entire fixed frame has the value "1", the transmitting apparatus 50 can detect that there is no idle-frame-transmit request information in the fixed stuff, and thus stop sending the idle frames.

Alternatively, the VC-4 mapper 404 may set any value in the fixed stuff of the VC-4 frame other than the value that includes an "A", such as "AA", "AB", "A8", "AE", "A2", "BA", "8A", "EA", "2A", etc., to request the transmitting apparatus 50 to stop sending the idle frames.

Figure 10:
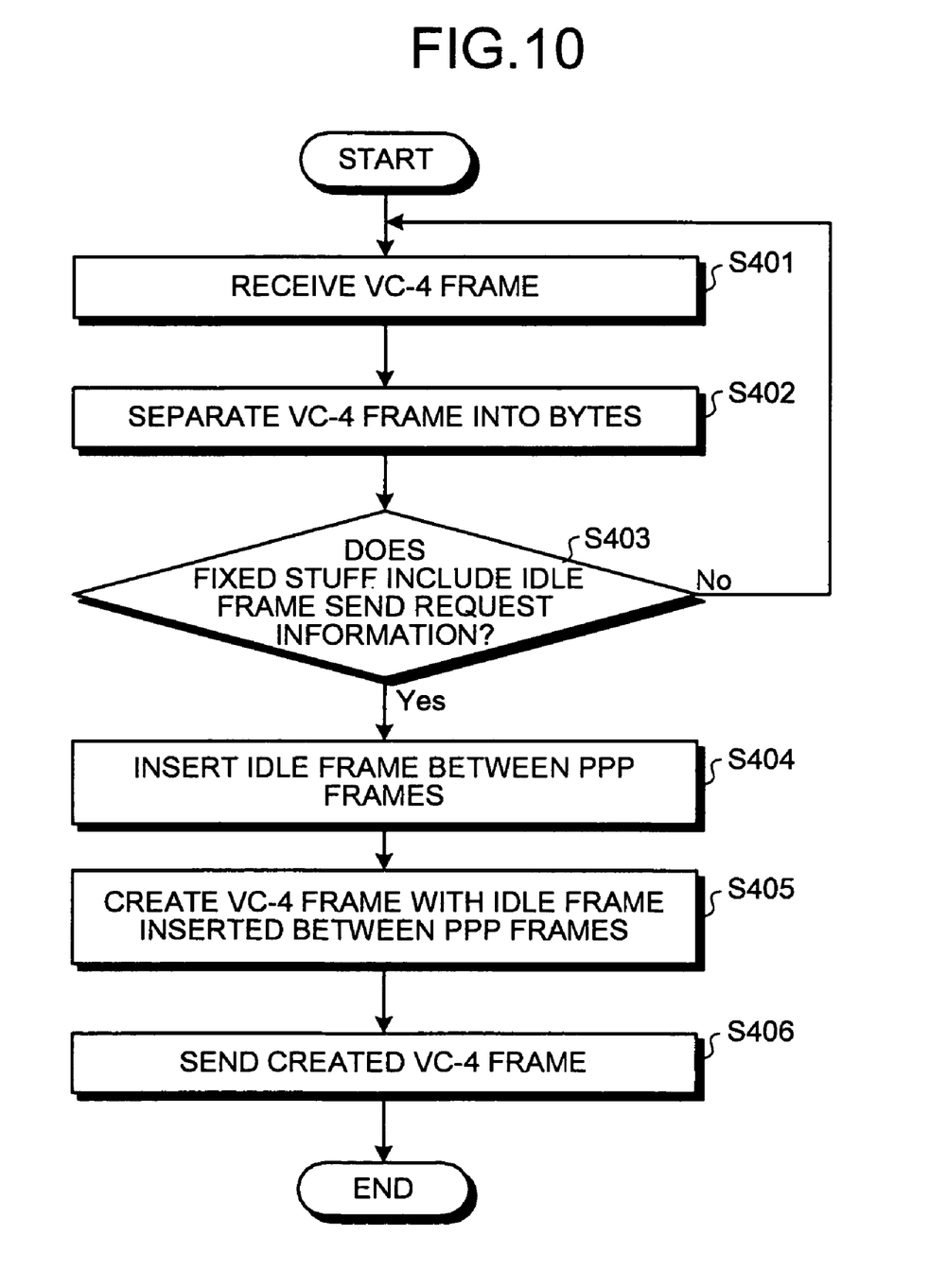
FIG. 10 is a flowchart of the transmitting process of the VC-4 frame that includes an idle frame.

FIG. 10 is a flowchart of the transmitting process of the VC-4 frame that includes an idle frame.

As shown in FIG. 10, once the data sent by the transmitting apparatus 40 is received by the data receiver 501 of the transmitting apparatus 10, the demultiplexer 90 of the VC-4 terminator 502 receives the VC-4 frame from the data receiver 501 (Step S401).

The demultiplexer 90 separates the VC-4 frame into bytes (Step S402). The control byte detecting unit 92 of the VC-4 terminator 502 determines whether the fixed stuff of the VC-4 frame includes the idle-frame-transmit request information (Step S403).

If the fixed stuff of the VC-4 frame includes the idle-frame-transmit request information ("Yes" at step S403), the PPP mapper 509 receives the idle frame from the VC-4 terminator 502, and insets the idle frame between the PPP frames (Step S404).

The VC-4 mapper 510 then creates a VC-4 frame with the idle frame inserted between the PPP frames (Step S405). The data transmitter 511 sends the created VC-4 frame to the transmitting apparatus 40 (Step S406), thus ending the transmitting process of the VC-4 frame that includes idle frames in it.

If the fixed stuff of the VC-4 frame does not include the idle-frame-transmit request information ("No" at step S403), the process returns to Step S401 to continue there onwards.

Thus, according to the present embodiment, the elastic storing unit 402 of the transmitting apparatus 40 or the elastic storing unit 409 of the transmitting apparatus 40 detects the amount of the data received from the client device or the transmitting apparatus 50. If the amount exceeds a predetermined threshold value, the VC-4 mapper 404 stores either fixed-stuff-usage information or idle-frame-transmit request information in the fixed stuff, and sends the VC-4 frame to the transmitting apparatus 50. Consequently, even if there is a data build-up in the transmitting apparatus 40, data transmission over the SDH network 60a is efficiently controlled so that there is no compromise in the data transmission efficiency.

Further, according to the present embodiment, The VC-4 terminator 502 of the transmitting apparatus 50 receives the VC-4 frame whose fixed stuff has either the fixed-stuff-usage information or the idle-frame-transmit request information stored therein, and based on the fixed-stuff-usage information or the idle-frame-transmit request information either retrieves the PPP frames or inserts idle frames between PPP frames. Consequently, data transmission over the SDH network 60a is efficiently controlled so that there is no compromise in the data transmission efficiency.

The present embodiment is explained with an example of VC frame, namely, the VC-4 frame that is transmitted and received over the SDH network. Any frame having a frame format of the VC-4 frame, that is, having a fixed stuff and payload may be used. Examples of such frames are VC frames such as VC-3 frames, STS frames such as Concatenated Synchronous transport signal Level 3 (STS-3c) frame, etc. used in SONET network, and the like.

All the automatic processes explained according to the present embodiment can be, entirely or in part, carried out manually. Similarly, all the manual processes explained according to the present embodiment can be entirely or in part carried out automatically by a known method.

The sequence of processes, the sequence of controls, specific names, and data including various parameters can be changed as required unless otherwise specified.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used.

The process function performed by each of the device parts is entirely or partially realized by the CPU or a program executed by the CPU or by a hardware using wired logic.

According to the present invention, when there is a data build-up in a transmitting apparatus, data transmission is efficiently controlled so that there is no compromise in the data transmission efficiency Furthermore, according to the present invention, when there is a data build-up in the transmitting apparatus, data transmission is efficiently controlled as well as the efficiency of data transmission is enhanced.

Moreover, according to the present invention, when there is a data build-up in the transmitting apparatus, an idle-frame insert request is efficiently sent so that there is no compromise in the efficiency of data transmission over the SDH/SONET network.

Furthermore, according to the present invention, data transmission is efficiently controlled so that there is no compromise in the efficiency of data transmission over the SDH/SONET network.

Moreover, according to the present invention, data transmission is efficiently controlled as well as the efficiency of data transmission is enhanced.

Furthermore, according to the present invention, the idle-frame insert request is efficiently received and the idle frame insertion process is carried out so that there is no compromise in the efficiency of data transmission over the SDH/SONET network.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A frame transmitting apparatus that transmits a frame having a header area, a payload area, and a buffer area between the header area and the payload area to an other apparatus, the frame transmitting apparatus comprising:
   a receiver to receive the frame transmitted from the other apparatus;
   a processor that is operative to detect an amount of data accumulated in the frame transmitting apparatus, to embed idle-frame-insert request information in the buffer area between the header area which stores control information pertaining to operational management of frame transmission and the payload area which stores Point to Point Protocol frames within the frame, the idle-frame-insert request information requesting inclusion of an idle frame in the payload area of a received frame, when the amount of data detected exceeds a threshold value, to determine whether the idle-frame-insert request information is included in the buffer area of the received frame, and to insert an idle frame in the payload area of the frame to be transmitted to the other apparatus, when the idle-frame-insert request information is included in the buffer area; and
   a transmitter to transmit the frame including the idle-frame-insert request information in the buffer area to the other apparatus, the frame including a virtual container frame or a synchronous-transport-signal frame, without halting transmission of the data to the other apparatus.

2. A frame receiving apparatus that receives a frame transmitted from an other apparatus, the frame receiving apparatus comprising:
   a receiver to receive the frame including a header area which stores control information pertaining to operational management of frame transmission, payload area which stores Point to Point Protocol frames, and a buffer area between the header area and the payload area from the other apparatus, the received frame including a virtual container frame or a synchronous-transport-signal frame;
   a processor that is operative to detect an amount of data accumulated in the other apparatus; to embed idle-frame-insert request information in the buffer area within the frame, the idle-frame-insert request information requesting inclusion of an idle frame in the payload area of the frame, when the detected amount of data exceeds a threshold value, to determine whether the idle-frame-insert request information is included in the buffer area between the header area and the payload area within the frame, the idle-frame-insert request information requesting inclusion of an idle frame in the payload area of a frame to be transmitted to the other apparatus, and to insert the idle frame in the payload area of the frame to be transmitted to the other apparatus, when the idle-frame-insert raciest information is included in the buffer area.

3. A method of transmitting and receiving, between a first apparatus and a second apparatus, a frame having a header area, a payload area, and a buffer area between the header area and the payload area, the method comprising:
   detecting, at the first apparatus, an amount of data accumulated in the first apparatus;
   embedding idle-frame-insert request information in the buffer area between the header area which stores control information pertaining to operational management of frame transmission and the payload area which stores Point to Point Protocol frames within the frame, the idle-frame-insert request information requesting inclusion of an idle frame in the payload area of a frame to be transmitted to the first apparatus, when the amount of data detected at the detecting exceeds a threshold value;
   transmitting, from the first apparatus to the second apparatus, the frame including the idle-frame-insert request information embedded in the buffer area, the frame including a virtual container frame or a synchronous-transport-signal frame;
   determining at the second apparatus, upon reception of the frame transmitted from the first apparatus at the transmitting, whether the idle-frame-insert request information is included in the buffer area of the received frame; and
   inserting an idle frame in the payload area of the frame to be transmitted to the first apparatus, when the idle-frame-insert request information is included in the buffer area.

4. A system for transmitting and receiving, between a first apparatus and a second apparatus, a frame having a header area, a payload area, and a buffer area between the header area and the payload area, the system comprising:
   a data-amount detector to detect an amount of data accumulated in the first apparatus;
   a control information setting unit to embed idle-frame-insert request information in the buffer area between the header area which stores control information pertaining to operational management of frame transmission and the payload area which stores Point to Point Protocol frames within the frame, the idle-frame-insert request information requesting inclusion of an idle frame in the payload area of a frame to be transmitted to the first apparatus, when the amount of data detected by the data amount detector exceeds a threshold value;
   a frame transmitter to transmit from the first apparatus to the second apparatus the frame including the idle-frame-insert request information embedded in the buffer area, the frame including a virtual container frame or a synchronous-transport-signal frame;

a frame terminating unit at the second apparatus, upon receiving the frame transmitted from the first apparatus by the transmitter, to determine whether the idle-frame-insert request information is included in the buffer area of the received frame; and a frame controller to insert an idle frame in the payload area of the frame to be transmitted to the first apparatus, when the idle-frame-insert request information is included in the buffer area.

* * * * *